United States Patent Office.

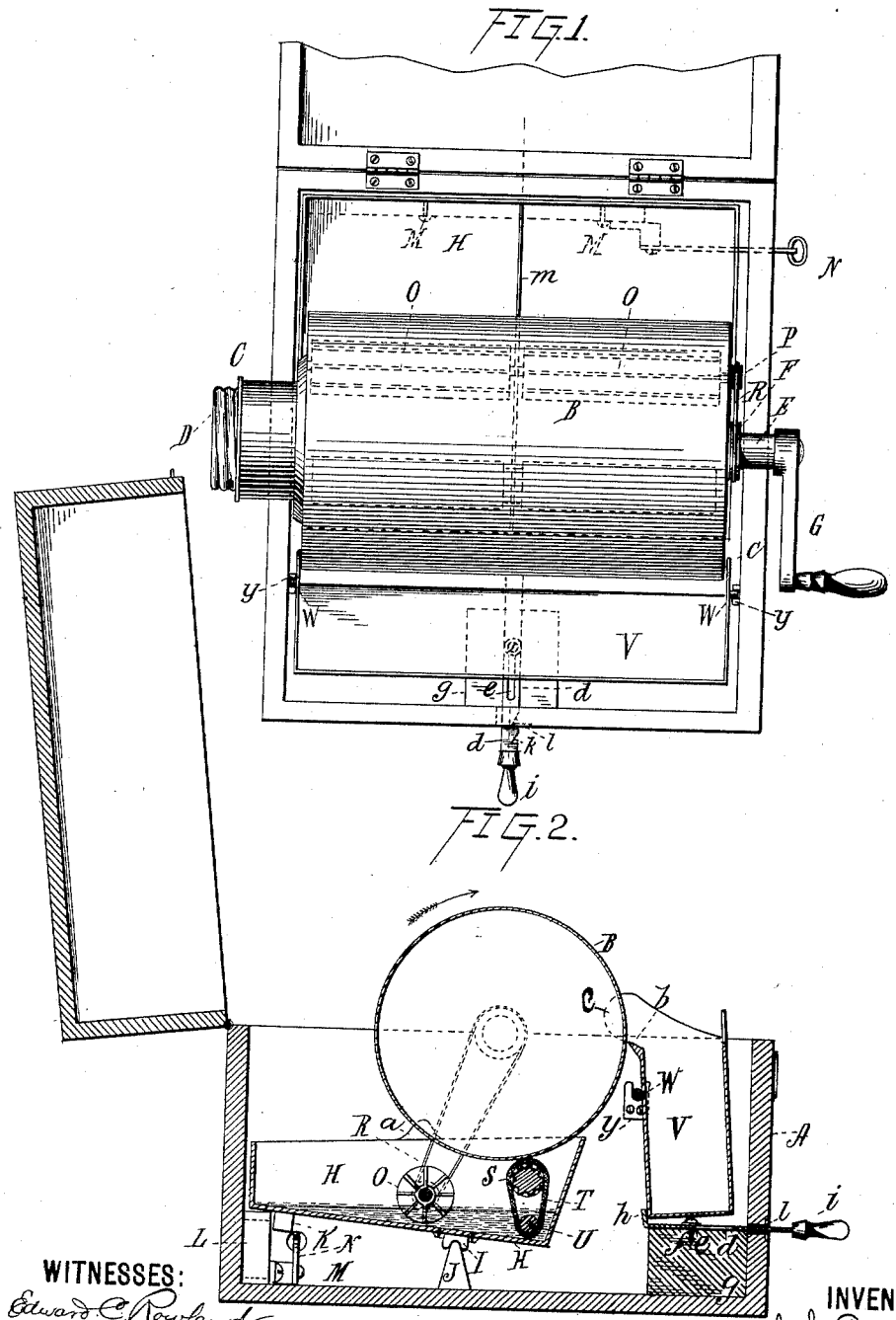

CHARLES L. BELLAMY, OF ARLINGTON, NEW JERSEY.

ICE-CREAM FREEZER.

SPECIFICATION forming part of Letters Patent No. 468,092, dated February 2, 1892.

Application filed February 5, 1891. Serial No. 380,268. (No model.)

*To all whom it may concern:*

Be it known that I, CHARLES L. BELLAMY, a citizen of the United States, residing at Arlington, in the county of Hudson and State of New Jersey, have invented a new and useful Improvement in Ice-Cream Freezers, of which the following is a specification.

My invention relates especially to that class of devices employed for freezing cream, &c., wherein the freezing-mixture is placed in a revoluble cylinder and the cream is frozen upon the periphery of the cylinder, and has for its object the provision of means and mechanism whereby the milk will be supplied to the freezing-cylinder in such a manner as to render the frozen cream smooth and of a fine quality.

To attain the desired end my invention consists, essentially, in a freezing-cylinder mounted in a frame or box, within which box is adjustably supported a milk holder or pan, wherein is an agitator for whipping the milk and means for supplying the milk to the periphery of the freezing-cylinder, and my invention also involves certain other novel and useful combinations or arrangements of parts and peculiarities of construction and operation, all of which will be hereinafter first fully described and then pointed out in the claims.

In the accompanying drawings, Figure 1 is a plan view of my improved freezer with the cover thrown back, and Fig. 2 is a cross-sectional view.

Like letters of reference, wherever they occur, indicate corresponding parts in both the figures.

A is the outside case or box.

B is a freezing-cylinder having a large trunnion C at one end, provided with a cap D, whereby the freezing-mixture may be introduced, and at the other end of the cylinder a shaft E is provided, having a pulley or wheel F thereon and a manipulating-crank G.

H is a milk holder or pan having bearings I beneath the bottom, which rest upon supports J.

K is a weight affixed to the bottom of the milk-holder, at one side thereof.

L is an adjustable support at the side of the box A and upon which the milk-holder rests. This support L is provided with diagonal slots, through which extend screws M, which engage with the side of the box A.

N is a rod secured to the support L and extending to the exterior of the box.

O is a rotatable agitator mounted in the milk-holder, the shaft thereof bearing a band-wheel or pulley P, and R is a driving-band passing from said wheel P to the wheel F on the shaft of the freezing-cylinder.

$a\ a$ are projecting scrapers, which extend upward at each side of the freezing-cylinder from the milk-holder to keep the said cylinder free from milk.

S is a roller, preferably corrugated, as shown, mounted in the milk-holder, and T is an endless band or belt, made of material such as lamp-wick, passing over said roller, being held in close proximity to the bottom of the milk-holder by a roller U.

V is a cream-receptacle mounted upon trunnions W, which engage in supports Y at the sides of the box A.

$b$ is a scraper forming the inner lip of the receptacle V, and $c\ c$ are projections at each side of said cylinder. $d$ is a movable bar slotted at $e$ and adjustably held in place by a screw $f$, engaging with a supporting-block $g$. This bar has an upwardly-projecting finger $h$ at its inner extremity, arranged to engage with the inner edge of the bottom of the cream-receptacle.

$i$ is a handle for manipulating the adjusting-bar.

When constructed and arranged in accordance with the foregoing description, the operation of my improved ice-cream freezer is as follows: The freezing-mixture being placed in the cylinder and the milk in the holder, the cylinder is caused to rotate, and the agitator beats the milk into a frothy condition. The periphery of the cylinder bears upon the band T, causing it to revolve and bring the milk upward and in contact with the freezing-cylinder. By this means, as the said band is porous, the milk is further beaten or agitated and adheres to the periphery of the cylinder while in a frothy state and is frozen while in that condition, the result of which is that the cream is as smooth and of as fine a grain as can be desired. The milk-holder, being mounted upon the supporting-trunnions, will allow the band T and its supporting-roller to be depressed to conform to the varying surface of the freezing-cylinder, and the weight upon the bottom of the milk-holder will cause the pressure exerted to be uniform and even.

If it is desired to drop the front of the milk-holder, by drawing outward upon the bar N the support L is raised, elevating the back of the pan. The cream is scraped from the cylinder by the scraper $b$ and falls into the receptacle V. By my method of hanging said receptacle at a point near the scraper and having the adjusting-arm engage with the receptacle near the bottom I am enabled to obtain great leverage, insuring the requisite pressure of the scraper to remove the frozen cream, while at the same time the receptacle may be instantly taken out for the removal of the cream. As the manipulating-bar $d$ is notched at $k$ and a plate $l$ is fixed in the wall of box A, the parts may be securely held in position.

I have shown the milk holder or pan as provided with a partition $m$, the object of which is to enable me to freeze two separate and distinct kinds of cream at one and the same time. By this arrangement when it is only desired to make one kind of cream both parts of the pan are filled with the same kind of milk or custard; but the two parts may be filled with different kinds, and the result will be that the same are applied to the freezing-cylinder separately, frozen separately, and removed from the cylinder separate from each other.

Having now fully described my invention, what I claim as new therein, and desire to secure by Letters Patent, is—

1. In an ice-cream freezer of the character herein specified, a horizontally-rotating freezing-cylinder adapted and arranged to rotate in a cream-feeding pan, within which is an agitator for mixing the cream before it is taken up by the cylinder, substantially as shown and described.

2. In an ice-cream freezer of the character herein specified, the combination, with the freezing-cylinder and a milk-holder, of a movable band arranged to enter the milk-holder and bear against the periphery of the freezing-cylinder, substantially as and for the uses and purpose shown and described.

3. In an ice-cream freezer of the character herein specified, an adjustable scraper and cream-receiver, said receiver being mounted upon trunnions near its inner upper edge and engaging at bottom with an adjusting-bar, substantially as shown and described.

4. In an ice-cream freezer of the character herein specified, a divided milk-holder wherein are located separate milk-applying devices, whereby two separate and distinct kinds of cream may be frozen upon the freezing-cylinder at one and the same time, substantially as shown and described.

CHARLES L. BELLAMY.

Witnesses:
A. M. PIERCE,
GERTRUDE WARD.